United States Patent
Wang et al.

(10) Patent No.: US 9,844,034 B2
(45) Date of Patent: Dec. 12, 2017

(54) METHODS AND APPARATUSES FOR CONTROLLING CONTROL CHANNEL INTER CELL INTERFERENCE

(71) Applicant: Telefonaktiebolaget L M Ericsson (publ), Stockholm (SE)

(72) Inventors: Hongwei Wang, Solna (SE); Ying Sun, Sundbyberg (SE); Dan Korsfeldt, Hässelby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 79 days.

(21) Appl. No.: 14/654,094

(22) PCT Filed: Dec. 2, 2013

(86) PCT No.: PCT/SE2013/051428
§ 371 (c)(1),
(2) Date: Jun. 19, 2015

(87) PCT Pub. No.: WO2014/098719
PCT Pub. Date: Jun. 26, 2014

(65) Prior Publication Data
US 2015/0327231 A1    Nov. 12, 2015

Related U.S. Application Data

(60) Provisional application No. 61/740,527, filed on Dec. 21, 2012.

(51) Int. Cl.
| | |
|---|---|
| *H04W 72/04* | (2009.01) |
| *H04J 11/00* | (2006.01) |
| *H04W 16/02* | (2009.01) |
| *H04L 5/00* | (2006.01) |
| *H04W 72/12* | (2009.01) |

(52) U.S. Cl.
CPC ......... *H04W 72/0406* (2013.01); *H04J 11/00* (2013.01); *H04J 11/005* (2013.01);
(Continued)

(58) Field of Classification Search
None
See application file for complete search history.

(56) References Cited

U.S. PATENT DOCUMENTS

2010/0309876 A1    12/2010 Khandekar et al.
2010/0317364 A1*   12/2010 Zhang .................. H04W 16/04
                                                                455/452.2
(Continued)

FOREIGN PATENT DOCUMENTS

EP        2 385 651 A2     11/2011
WO    WO 2010/060455 A1     6/2010
(Continued)

OTHER PUBLICATIONS

International Search Report and Written Opinion of the International Searching Authority, PCT Application No. PCT/SE2013/051428, Apr. 11, 2014, 15 pages.
(Continued)

*Primary Examiner* — Adnan Baig
(74) *Attorney, Agent, or Firm* — Sage Patent Group

(57) ABSTRACT

Methods and arrangements for mitigating or avoiding inter cell interference on a control channel on which scheduling request are transmitted from UEs to a serving base station. The solution relates to classifying the UEs based e.g. on the type of services applied by the UEs, and allocating resources on the control channel based on the classification.

12 Claims, 16 Drawing Sheets

(52) U.S. Cl.
CPC .......... *H04L 5/0016* (2013.01); *H04L 5/0053* (2013.01); *H04L 5/0073* (2013.01); *H04W 16/02* (2013.01); *H04W 72/1226* (2013.01); *H04W 72/1278* (2013.01)

(56) References Cited

U.S. PATENT DOCUMENTS

2011/0292823 A1    12/2011  Barbieri et al.
2012/0238263 A1*  9/2012  Caretti .................. H04W 16/10
                                                        455/426.1

FOREIGN PATENT DOCUMENTS

WO    WO 2010/112065 A1    10/2010
WO    WO 2010112065 A1 *  10/2010  ........ H04W 72/0453
WO    WO 2012/149953 A1    11/2012

OTHER PUBLICATIONS

Vodadfone, "QoS Support based on Intercell Interference Coordination", 3GPP TSG RAN WG2 Meeting #60, R2-075030; Jeju, Korea, Nov. 5-9, 2007, 2 pages.
Alcatel-Lucent, "UL Hopping Transmission with grant based frequency shift information", 3GPP TSG RAN WG1 Meeting #52bis, R1-081550; Shenzhen, China, Mar. 31-Apr. 4, 2008, 3 pages.
Communication with Supplementary European Search Report, EP Application No. 13863876.2, Aug. 18, 2016.

* cited by examiner

METHODS AND APPARATUSES FOR CONTROLLING CONTROL CHANNEL INTER CELL INTERFERENCE

CROSS REFERENCE TO RELATED APPLICATIONS

This application is a 35 U.S.C. §371 national stage application of PCT International Application No. PCT/SE2013/051428, filed on 2 Dec. 2013, which itself claims priority to U.S. provisional Application No. 61/740,527, filed 21 Dec. 2012, the disclosure and content of both of which are incorporated by reference herein in their entirety. The above-referenced PCT International Application was published in the English language as International Publication No. WO 2014/098719 Al on 26 Jun. 2014.

TECHNICAL FIELD

The present disclosure relates generally to a method and an apparatus for controlling the inter-cell interference (ICI) between cells when receiving control signals.

BACKGROUND

A mobile radio network covers a geographical area which is divided into cell areas, wherein each cell area is generally served by a radio network node. A radio network node may be a Radio Base Station (RBS), also sometimes referred to as e.g. "eNB", "eNodeB", or BTS (Base Transceiver Station). A radio network node or RBS may provide radio coverage to one or more cells. The radio network nodes communicate with user equipments (UEs) also referred to as mobile stations, mobile terminals, wireless terminals, mobile telephones, cellular telephones or smart phones situated within its radio network cell. Other examples of UEs are laptops, notebooks, tablets and handheld devices. All of those having wireless communication capabilities. In addition, a radio mobile communication may be performed between two or more UEs, two or more radio network nodes or two or more radio network core nodes. All of the above-mentioned pieces form part of a radio mobile network.

When the communication is performed between two user equipments, each of these equipments communicates within a frequency band or channel allocated to one operator in a radio network. The frequency band may be a whole spectrum chunk whilst a channel may be a subset of the spectrum resources of the frequency band used for resource management purposes.

Furthermore, the frequency bands in Long Term Evolution (LTE) may operate in both paired and unpaired spectrum, requiring flexibility in the duplex arrangement.

The LTE-system has a Physical Uplink Control Channel (PUCCH) which is used to carry the Layer 1 and Layer 2 (L1/L2) control information. The transmitted control information is mainly a periodic channel state report e.g. Channel Quality Indicator, CQI, a hybrid-ARQ (Automatic Repeat Request) acknowledgement ACK/non-acknowledgement NACK) corresponding to the downlink transmission or a scheduling request (SR). Different information needs different number of bits and different PUCCH formats are defined to classify those. In this application, we focus on the scheduling request, SR, on PUCCH.

The scheduling request, SR, is a request from a user equipment, UE, to a Radio Base Station (RBS) to be allocated resources for uplink communication. The RBS receives the SR and identifies which UE the SR belongs to. This is possible because each of the UEs is allocated a static and unique PUCCH SR resource which is configured by RBS. FIG. 1 shows an allocated PUCCH SR resource for a UE.

The scheduler in an RBS needs to be aware of the queue status in each UE in order to perform an adequate scheduling in the uplink, i.e. in the direction from the UE to the RBS. For this reason, a "UE send buffer status report" is transmitted to the RBS to inform about the send buffer status. In order to transmit the buffer status report, a SR is sent/triggered by the UE, in order to ask for an UL scheduling resource. Consequently, a SR is transmitted by the UE on a SR resource (on the PUCCH) selected by the RBS when a buffer status report is to be sent, e.g., when new data have arrived to a previously empty UE buffer, or when newly arrived data have higher priority than the existing data stored in the UE buffer.

The amount of SRs generated or triggered by each UE is very dependent on the characteristic of different types of traffic. One type of traffic that triggers lots of SRs is Voice over IP (VoIP), where small amounts of data arrive frequently Moreover, VoIP has high priority and is to be scheduled quickly after the data arrives. Since the data arrival time is short, the UE buffer may already be empty when the next VoIP packet arrives.

As standardized, the SRs are to be transmitted on the PUCCH and only one PUCCH SR resource is allocated. However, when a UE is not allocated any PUCCH resource, e.g. due to that the number of users exceeds the PUCCH SR capacity, the SRs may still be transmitted but on the contention based Random Access Channel (RA-SR). In practice, it is desired to not use RA-SR too often, due to the higher delay and additional signaling compared with PUCCH SR.

The PUCCH SR should be unique in at least one of three dimensions, i.e. time domain, frequency domain and coding domain. SR periodicity is introduced to achieve the time domain SR multiplexing, where a UE only can send SR periodically with a certain offset in time. Different UEs are able to send SRs on different resource blocks (RB) pairs or with different coded sequences resulting in the frequency domain and coding domain multiplexing. The different coded sequence refers to different orthogonal sequences or cyclic shifts. If the three domains are multiplexed, the capacity of the PUCCH SR is highly improved and a large number of UEs obtain their own unique PUCCH SRs. In total, there are a maximum of 36 code sequences for PUCCH SRs in one RB pair, which means that a maximum of 36 UEs can send SRs at the same time with the same RB pair.

PUCCH SRs are orthogonal within a cell, which entails that no intra-cell interference is generated. However, the inter-cell SR interference is significant when users belonging to different cells are transmitting SRs at the same time using the same resource block (RB). When the inter-cell SR interference increases, the number of errors related to SR detection in the RBS increases as well, and network performance decreases.

Further, the mere allocation of one PUCCH SR does not necessarily mean that PUCCH SR interference is generated. This is because the interference will only be generated when the PUCCH SR resource is utilized, i.e. when an SR is sent. As previously explained, the SR is triggered only for uplink data transmission and different types of users/UEs will generate a different amount of SRs.

SUMMARY

It would be desirable to protect sensitive UEs from inter-cell interference (ICI) on the PUCCH. The aspects and embodiments of the herein disclosed solution enables such protection.

According to a first aspect, a method is provided to be performed by a base station. The method comprising determining a type of service associated with a UE. The method further comprises determining whether the UE belongs to a first group of UEs or a second group of UEs, based on the type of service associated with the UE. Further, the method comprises, when the UE is determined to belong to the first group of UEs, allocating resources on the PUCCH to the UE in a first section of PUCCH resources; and then receiving SRs from the UE in the allocated resources in the first section of PUCCH resources. The method further comprises, when the UE is determined to belong to the second group of UEs, allocating resources on the PUCCH to the UE in a second section of PUCCH resources; and then receiving SRs from the UE in the allocated resources in the second section of PUCCH resources.

According to a second aspect, a method is provided to be performed by a UE. The method comprises transmitting SRs to a base station on the resources allocated to the UE by the base station. Further, when a change associated with the UE implies that the UE should be associated with the other one of a first and a second group of UEs; an indication is received from the base station, indicative of other resources on the PUCCH, to be used by the UE for transmission of SRs to the base station, instead of the previously used resources. The method further comprises transmitting SRs to the base station on the indicated resources.

According to a third aspect, a method is provided to be performed by a base station. This method is for coordinating the PUCCH resources for the different UE groups between neighboring base stations. The method comprises receiving information regarding resources used by a neighboring base station, BS2, for PUCCH, the information comprising an indication regarding a division into at least a first and a second section of the PUCCH resources in time, frequency and/or code, wherein the first section is associated with a first group of UEs, and the second section is associated with a second group of UEs. The method further comprises determining, from amongst corresponding sections of PUCCH resources in time, frequency and/or code, a section that is to be used by BS1 for the first group of UEs; such that the determined section does not coincide with the section used by the neighboring base station for the first group of UEs. Further, the method comprises allocating PUCCH resources to UEs belonging to the first group in the determined section and PUCCH resources to UEs belonging to a second group in another section.

According to other aspects, different embodiments of the base stations and UE mentioned above, are provided, as well as computer programs and computer program products associated with the aspects described above.

BRIEF DESCRIPTION OF DRAWINGS

The foregoing and other objects, features, and advantages of the solution disclosed herein will be apparent from the following more particular description of embodiments as illustrated in the accompanying drawings. The drawings are not necessarily to scale, emphasis instead being placed upon illustrating the principles of the solution disclosed herein.

DETAILED DESCRIPTION

Briefly described, the embodiments described here may be provided to decrease and control the PUCCH SR interference between cells by managing the allocated PUCCH SR resources between cells in the time, frequency and/or code domain and among different categories of users or UEs. The controlling of the PUCCH SR resources may avoid interference peaks by separating high SR utilization UEs and Low SR utilization UEs in different regions even at high load scenarios where all the PUCCH SR resources are allocated.

The expressions "High SR utilization UEs" and "Low SR utilization UEs" are reflecting the amount of SRs that a UE is generating in a certain time. This amount of SRs is very much dependent on the characteristic of the traffic that the UE is carrying. VoIP is a type of traffic that generates a large number of SRs. The UEs that carries this type of traffic may be referred to as High SR Utilization UEs. On the other hand, UEs that only generate a small amount of SRs may be referred to as Low SR Utilization UEs, which could be UEs applying services like chat, web browsing or any OTT (Over-the-top) application which has pushing service, e.g. twitter or facebook.

The PUCCH interference problem arises when a large amount of High SR utilization UEs start to get into the network. For example, when many of the High SR utilization UEs are allocated SR resources on the PUCCH at the same time in neighboring cells, there may be PUCCH SR peaks, which may result in severe ICI on the PUCCH. Moreover, since the PUCCH SR is transmitted periodically without any backoff mechanism, once the high interference results into misdetection of PUCCH SR and PUCCH SR retransmission, the same amount of interference will occur at all the PUSCCH SR retransmission occasion. Therefore, it is critical to solve the ICI on PUCCH.

For later releases of LTE, there is a possibility to use so-called SR masking (logical Channel SR-Mask defined in 3GPP 36.321) which may prevent UEs to send SRs for a certain logical channel. The SR masking can help to decrease the SR inter cell interference for some specific data traffic. However, SR masking requires a special scheduling algorithm, so-called semi-persistent scheduling, which is not applicable in many cases. Moreover, as for the LTE release 8 UEs, the SR interference is still a huge problem as described above.

Figure 1:
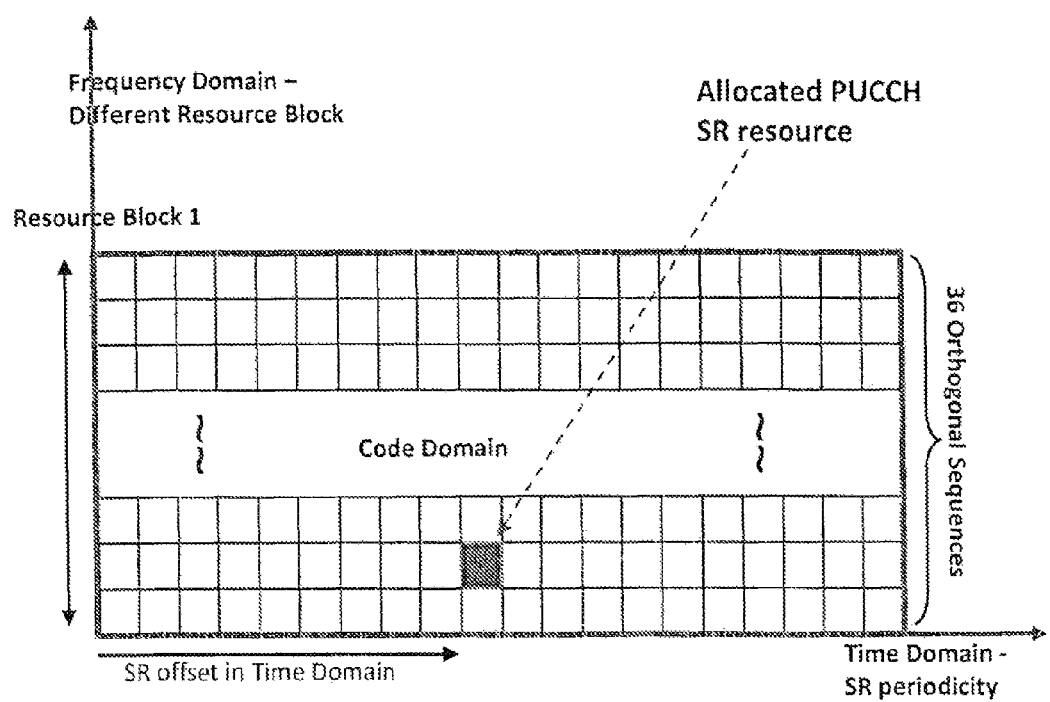
FIG. 1 shows an allocated PUCCH SR resource for a UE.
Figure 2:
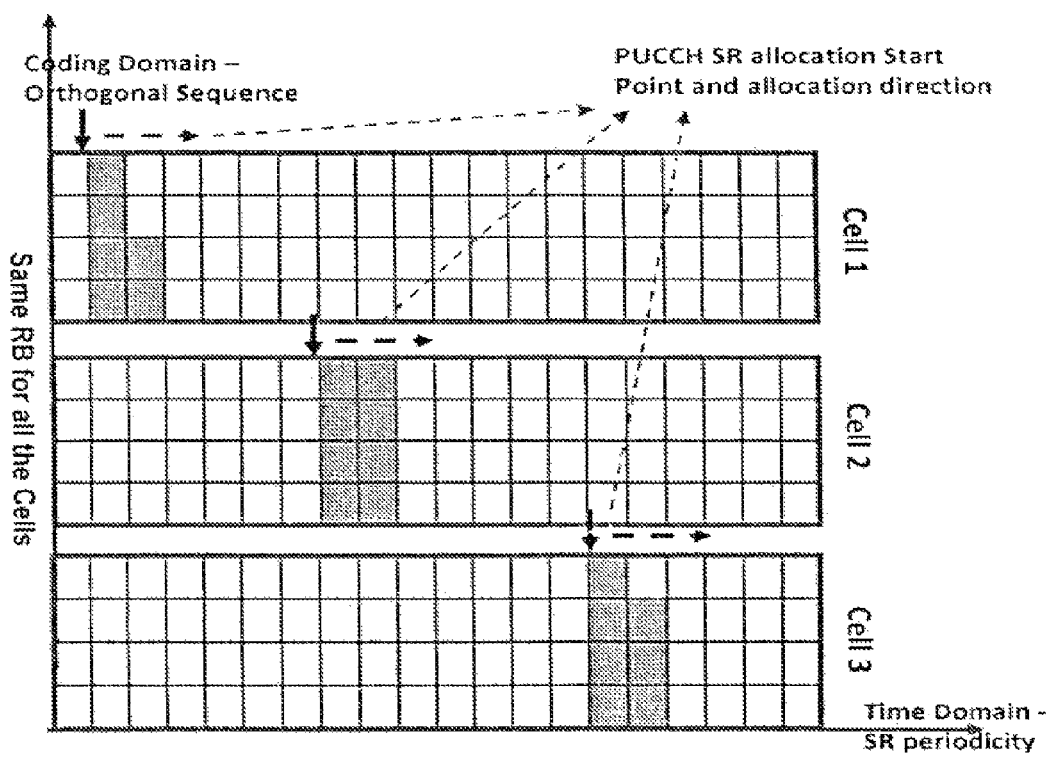
FIG. 2 is a diagram illustrating three coordinated cells with different start points, according to some possible embodiments.
Figure 3:
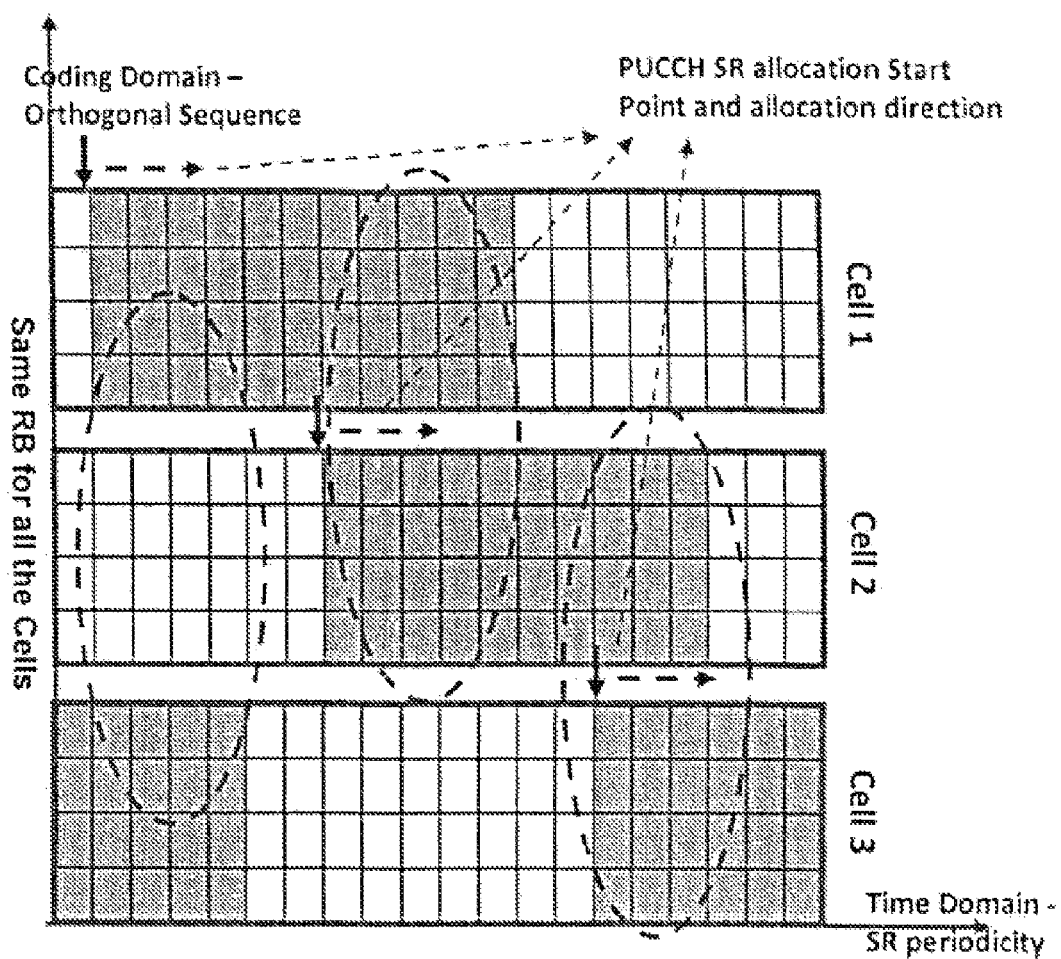
FIG. 3 is a diagram showing an overlapping of the PUCCH SR region due to high traffic.

When the allocated (occupied) PUCCH SR resources are less than one third of the total amount of PUCCH resources or PUCCH SR capacity, inter-cell PUCCH SR interference may be avoided irrespective of type of SR usage of the UEs, as illustrated in FIG. 2. The FIG. 2 shows three coordinated cells with different starting points when searching for PUCCH SR resources. As seen in this FIG. 2, the same resource block (RB) pair is used for the PUCCH in all three cells with different coding, and a separation in the time domain creates improved interference avoidance between the cells. In the case the number of users/UEs is increased, the PUCCH resources allocated to a user in one cell may coincide with the PUCCH resources allocated to another user in a neighboring cell. An overlap may arise e.g. in the time domain, as shown in FIG. 3, which degrades the gain.

By classifying UEs into High SR utilization UEs and Low SR utilization UEs, the PUCCH SR resources may be divided among different "types" of users/UEs, and the resources used for High SR utilization UEs may be divided among, i.e. separate for, neighboring cells, in order to reduce or avoid the PUCCH SR ICI. The classified UE type could be changed for a UE following the change of traffic. For example, a web browsing UE, classified as a Low SR utilization UE, should be reclassified/changed into a High SR utilization UE when initiating a VoLTE call, and the PUCCH SR resource should be reconfigured accordingly. The UE category may be further re-evaluated by the RBS, based on the number of received SRs from the UE during a certain time unit, e.g. a window.

In the following paragraphs, different aspects of the solution disclosed herein will be described in more detail with references to certain embodiments and to accompanying drawings. For purposes of explanation and not limitation, specific details are set forth, such as particular scenarios and techniques, in order to provide a thorough understanding of the different embodiments. However, other embodiments may depart from these specific details.

Figure 4:
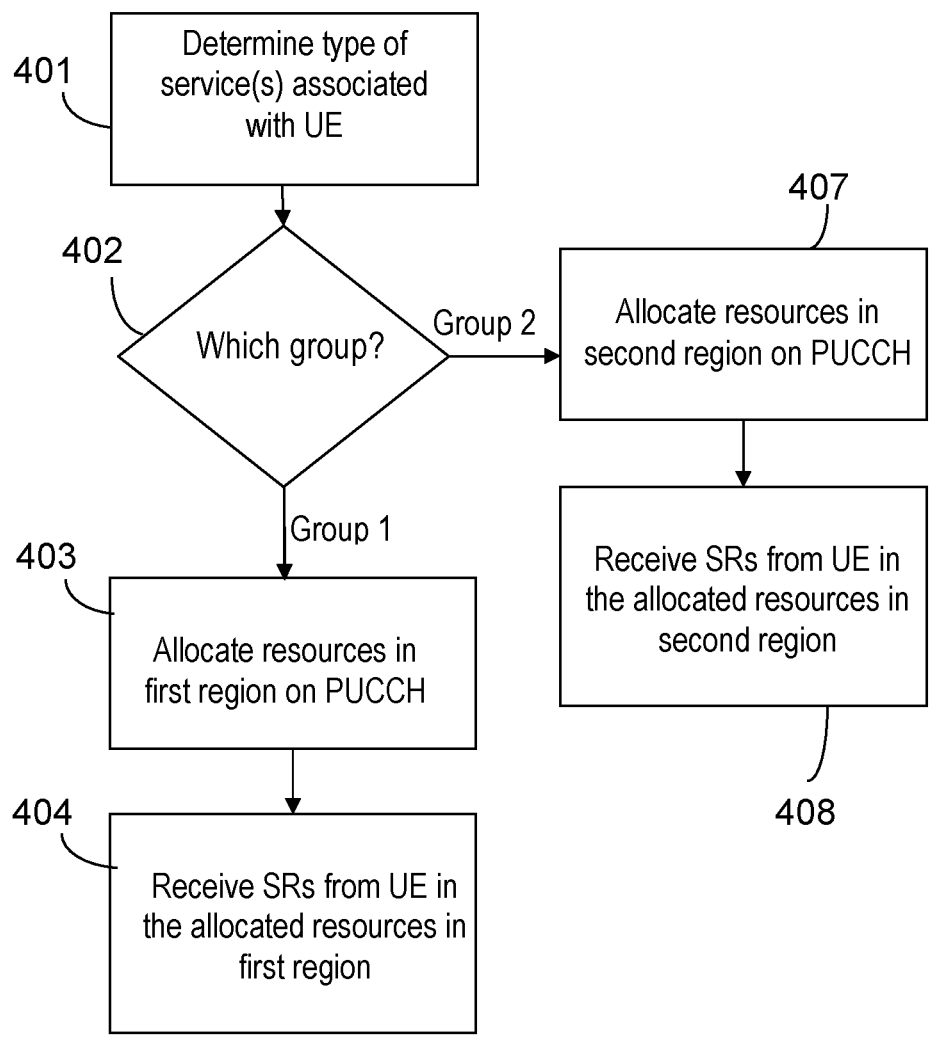
FIG. 4 is a flow chart illustrating a method performed by a base station, according to an exemplifying embodiment.

Exemplifying Method Performed by Base Station, FIG. 4

Exemplifying embodiments of a method performed by a base station will now be described with reference to FIG. 4. The base station, denoted BS1 in the example, is operable to serve a number of UEs in a wireless communication system.

FIG. 4 illustrates the method comprising determining 401 a type of service associated with a UE. The method further comprises determining 402 whether the UE belongs to a first group of UEs or a second group of UEs, based on the type of service associated with the UE. Further, the method comprises, when the UE is determined to belong to the first group of UEs, allocating 403 resources on the PUCCH to the UE in a first section of PUCCH resources; and then receiving 404 SRs from the UE in the allocated resources in the first section of PUCCH resources. The method further comprises, when the UE is determined to belong to the second group of UEs, allocating 407 resources on the PUCCH to the UE in a second section of PUCCH resources; and then receiving 408 SRs from the UE in the allocated resources in the second section of PUCCH resources.

The type of service associated with a UE could be determined in different ways, which will be further described below. Further, the groups of UEs may be defined in slightly different ways, but the main idea is that UEs generating a lot of SRs, due to the type of services associated with the UE, should belong to one group, and UEs that generate few SRs (in comparison), and thus generates less PUCCH inter cell interference, should belong to another group. The resources on the PUCCH are divided into a plurality of sections, where it has been decided at some point, e.g. during initialization, which section is to be used for which group of UEs. That is, for example, that section 1 should be used for UEs belonging to group 1 and section 2 should be used for UEs belonging to group 2. By doing this, the UE group creating most ICI due to SRs could be allocated to different PUCCH sections (resources) in neighboring cells. The different sections, or at least part thereof, should preferably be orthogonal between neighboring cells in at least one of time, frequency and code.

Thus, when it is determined 402 that a UE belongs to group 1, resources should be allocated for this UE in a section on the PUCCH which is assigned for group 1 UEs, e.g. section 1. The information on the allocated resources is signaled to the UE, which then transmits SRs on the allocated resources in section 1. The UE need not be aware of the different sections, but only does as it is told.

Similarly, when it is determined 402 that a UE belongs to group 2, resources should be allocated for this UE in a section on the PUCCH which is assigned for group 2 UEs, e.g. section 2. The information on the allocated resources is signaled to the UE, which then transmits SRs on the allocated resources in section 2. Moreover, a change of the services applied by the UE may result in a change of the classified UE group, which may further result in a reallocation of the assigned PUCCH resource. This will be further described below The type of service associated with a UE may be determined based on information related to a setup or release, or shut down, of a service bearer for the UE. Such information could be received from the UE, derived from information received from the UE, or the base station may determine which bearers that are associated with the UE without involvement of the UE. The base station may be aware of or informed by core network a mapping between a type of service and a bearer, and may conclude which type of service the UE is engaged in based on the bearers associated with the UE. Thus, when the UE belongs e.g. to UE group 2, and a new service bearer is to be set up for the UE, for a service having the characteristics belonging to group 1, the UE should be associated to UE group 1 instead of UE group 2, and could thus be re-allocated to another section on the PUCCH.

Alternatively or in addition, the type of service could be determined by that the base station counts the number of SRs received from the UE during a period of time, e.g. a time window of 1-5 seconds. For a UE which was previously classified as a High SR utilization UE, if the number of SRs received during the measuring window is lower than a threshold, with hysteresis, the RBS should change the UE category to Low SR utilization UE, and reconfigure the PUCCH SR resource to a "Low SR utilization"-resource. The threshold value may be different for different implementations. For example, the threshold could depend on the status of the UEs in the cell, such that the threshold represents the number of SR per time unit generated by the top 20-30% of UEs on average with respect to SR generation. 5-10 SR/Sec may be a good threshold value to start with if no typical statistic information is available for a cell. The hysteresis is used to avoid the so-called ping-pong effect, when the category of the UE oscillates back and forth. Typically, the hysteresis should be set to 20%-40% of the threshold value.

For a UE which was previously classified as Low SR utilization UE, if the number of SRs received during the measuring window is higher than a threshold, the RBS should change the UE category to Low SR utilization UE, and reconfigure the PUCCH SR resource for the UE to a "High SR utilization"-resource.

A first UE group may comprise UEs currently applying services generating bursty traffic, and thus generating significantly more SRs per time unit than a second group of UEs. The second UE group then comprises UEs applying services generating less bursty traffic than UEs in the first group. The UEs of the second group thus generates significantly less SRs per time unit than UEs in the first group. Previously herein, the UEs of the first group have been denoted "High SR utilization UEs", and the UEs of the second group have been denoted "Low SR utilization UEs".

With this definition, services are divided into services generating bursty traffic and services generating non-bursty traffic, or at least less bursty traffic than the first type of services. Examples of services generating bursty traffic are VoIP and online gaming. Examples of services generating non-bursty traffic is e.g. web-browsing and chat services. The burstyness of a service is not necessarily related to the data rate of the service. For example, uploading of a large video file may generate a lot of traffic, but not many SRs. Other, bursty services may generate an SR for every packet that is sent, e.g. 50 SRs and 50 packets per second.

RBS should originally classify the UE category based on the service type that is associated to the UE or following the indication of the higher layer, like Core network and configure the PUCCH SR resource accordingly. Furthermore, the RBS should re-evaluate the UE category based on the received number of SRs, and reconfigure the PUCCH SR resources accordingly. A threshold may be formulated based on statistics of generation of SRs of different types of services, and services where the number of generated SRs per time unit, e.g. in average, exceeds the threshold are associated to group 1; and services where the number of generated SRs per time unit, e.g. in average, falls below the threshold are associated to group 2. Moreover, a hysteresis algorithm and a timer function may be applied to protect the system from any ping-pong effects.

Figure 7:
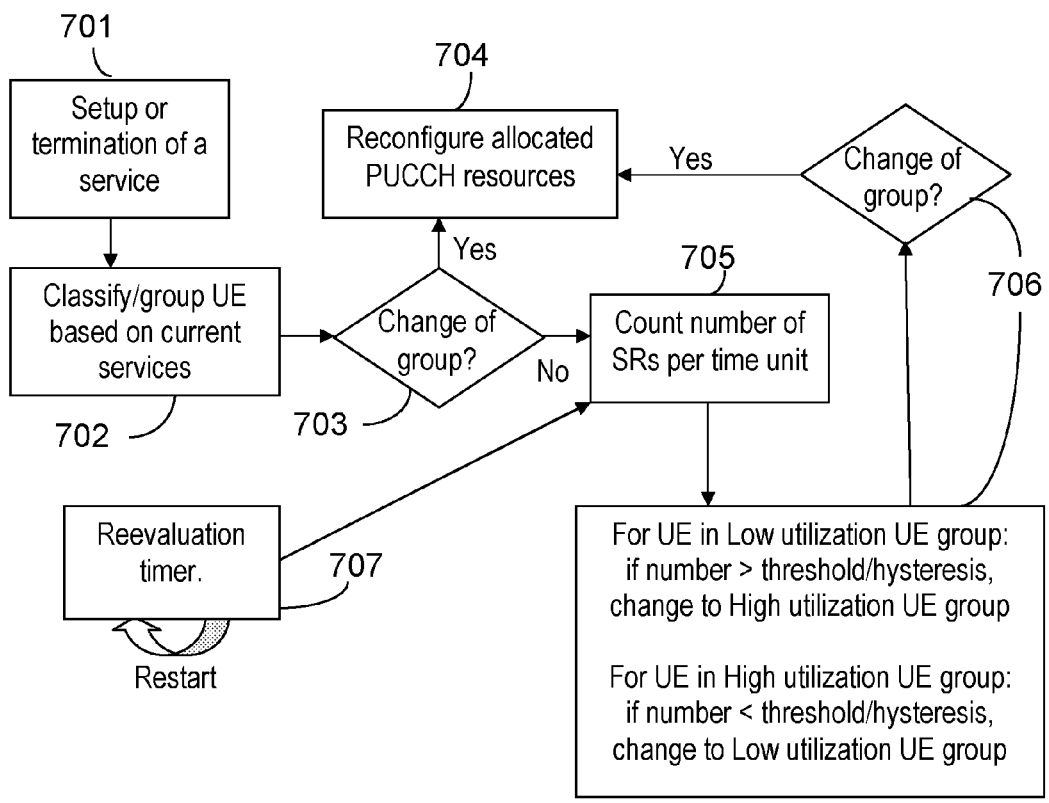
FIG. 7 is a flow chart illustrating a method performed by a base station, according to an exemplifying embodiment.

In an exemplifying embodiment illustrated in FIG. 7, the evaluation of the UE category is triggered at the change 701 of the traffic of a UE, and, at the expiry of a predefined evaluation timer 707. At the point of the change of the traffic of UE, exemplified in FIG. 7 as that an existing service is terminated or a new service is initiated, the RBS evaluates the UE category based on the characteristic of the existing service, and the PUCCH resource should be reconfigured 704 upon the change of UE category.

The RBS may further count 705 the number of SRs that are generated by the UE in/during a certain measurement window, to check if the UE category is estimated correctly. The length of the measuring window may be implementation dependent, depending e.g. on the capacity of the RBS. In most cases, a window of a duration of 1-5 seconds would be adequate.

For a UE which was classified 702 as a High SR utilization UE: if the number of SRs received 705 during the measuring window is lower than a threshold with hysteresis, the RBS should change 706 the UE category to Low SR utilization UE, and reconfigure 704 the PUCCH SR resource. The threshold value could vary between different implementations, and depend e.g. on the status of the UEs in the cell. The threshold could e.g. represent the number of SRs generated by the top 20-30% of the UEs in the cell, on average. As previously mentioned 5-10 SR/sec is a good start value if no cell statistics are available.

For a UE which was classified 702 as Low SR utilization UE: if the number of SRs received during the measuring window is higher than a threshold, the RBS should change the UE category 706 to High SR utilization UE, and reconfigure 704 the PUCCH SR resource accordingly.

In addition to that a change of service of a UE triggers a UE classification 702, an evaluation Timer 707, or "Re-evaluation timer" could be used to trigger a re-evaluation of the UE category. For example, at the expiry of the timer the RBS should start to count the number of SRs generated by the UE for a certain measurement window, to check if the UE category is still correctly classified. The characteristics of the evaluation, or reevaluation, timer is very much an implementation decision, where the RBS capacity should be considered. An exemplifying timer value of 100-500 seconds is a good example, if there are no specific requirements.

Moreover, the determining of whether a UE should belong to, or be associated to, a first or a second group of UEs may further be based on the "geometry" or location of the UE, e.g. the location within a cell associated with the base station with regard to the distance from the base station and also with regard to e.g. the distance to the neighboring cells/base stations. The geometry of the UE will impact the threshold of number of SRs for the classification of UE category. For example, for a UE at the center of a cell, a higher or larger threshold value could be used. That is, a UE at the center of a cell would need to generate more SRs per time unit to be classified as a High SR utilization UE than a UE located closer to the cell border and thus closer to neighboring cells/base stations.

Furthermore, the movement of the UE may also be considered for the UE classification. A UE with a certain high speed could e.g. be excluded from the otherwise performed evaluation of UE category, and directly be classified as a High SR utilization UE regardless, as long as it moves at said high speed UEs applying services that generate many SRs per time unit are sensitive to interference on the PUCCH, and the reason for grouping such sensitive UEs is to be able to protect them from ICI. However, there are situations where a PUCCH interference sensitive UE is in less need of being protected from ICI, and likewise, there are situations where a more non-sensitive UE may be in need of interference protection. For example, a PUCCH interference sensitive UE which is located close to the base station is less subjected to ICI than when located at the cell border. Further, a non-sensitive UE which is moving e.g. at high speed will be more sensitive to PUCCH interference than when being stationary, and may thus need interference protection.

Therefore, based on the location of the UE and/or the speed/movement of the UE, the UE could be associated to, placed in, another group than the group they would have been associated to if going strictly by the criterion related to the services applied by the UE. That is the decision whether a UE belongs to a first or a second group could be based on the type of services applied by the UE and one or both of the location, e.g. in relation to serving base station and/or cell border or neighboring cells/base stations, and the movement, in terms e.g. of velocity and/or acceleration.

Figure 5:
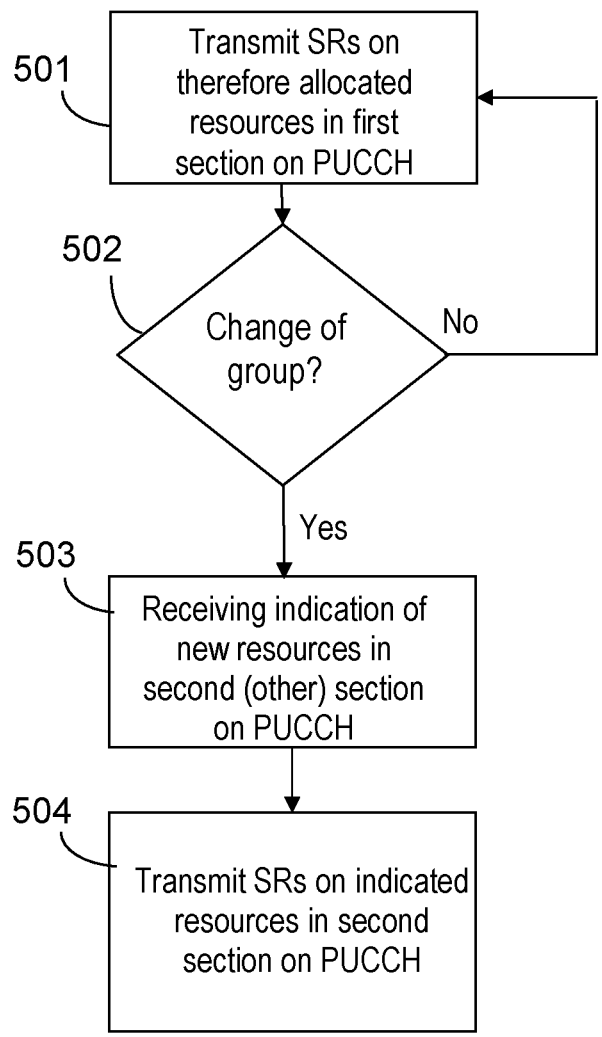
FIG. 5 is a flow chart illustrating a method performed by a UE, according to an exemplifying embodiment.

Exemplifying Method Performed by a UE, FIG. 5

Embodiments herein also relate to a method performed by a UE, which will be described below with reference to FIG. 5. The method performed by the UE is linked to the method performed by the base station described above in that it enables the UE to change the PUCCH resources on which it transmits SRs to the base station. This is not possible in prior art UEs.

The UE performing the method is associated with resources on a PUCCH, which resources have been allocated to the UE by a base station for transmission of SRs. The UE is associated with one of a first and a second group of UEs, as described above, although the UE need not be aware of this association to a group, or what characterizes a certain group.

The method performed by a UE comprises transmitting 501 SRs to the base station on the resources allocated to the UE by the base station. Further, when a change associated with the UE implies that the UE should be associated with the other one of the first and the second group of UEs; an indication is received 503 from the base station, indicative of other resources on the PUCCH, to be used by the UE for transmission of SRs to the base station, instead of the previously used resources. The method further comprises transmitting 504 SRs to the base station on the indicated resources.

That is, at some point, the UE has been allocated (assigned) resources on the PUCCH based on the concept of UE groups described above. Then, when there is a change e.g. in the set of services applied by the UE, e.g. that one service is terminated, or another service is started, and this change implies that the UE does no longer belong to e.g. UE group 1 (high SR activity) but to UE group 2 (low SR activity). This change may be determined or observed by the UE, but could alternatively be entirely determined in the base station. In FIG. 5, this change is illustrated as the action 502. However, as previously mentioned, the UE need not be aware of the concept of groups.

The change associated with the UE could be e.g. one or more of: a change of services; a change of location and a change of movement, in analogy with what was described above in association with the method for a base station.

When the change is a change of services associated with the UE, this change could be determined based on information related to a setup or release/shut down of a service bearer. This could be performed in the UE, as previously mentioned, but the determining could alternatively be performed in the base station.

The UE groups are of the same type as described above.

Figure 6:
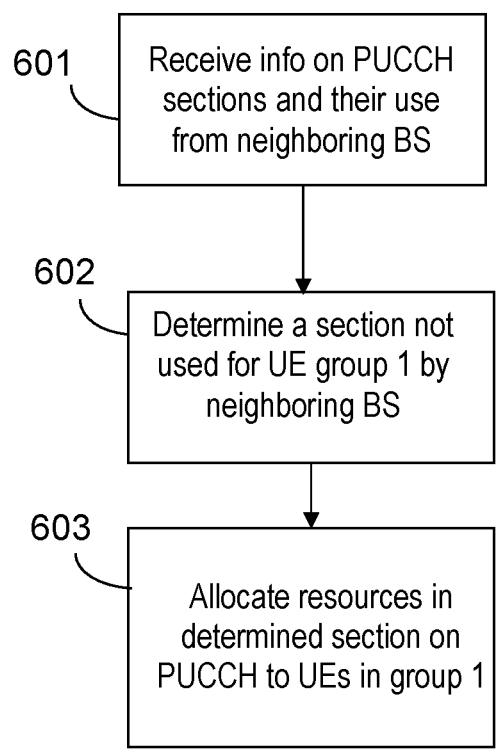
FIG. 6 is a flow chart illustrating a method performed by a base station, according to an exemplifying embodiment.

Method in Base Station for Coordinating Resources, FIG. 6

Embodiments herein also relate to a method performed by a base station, which will be described below with reference to FIG. 6. The method performed by the base station is linked to the methods performed by the base station and UE described above in that it enables automatic dividing of PUCCH resources between neighboring base stations, such that PUCCH SR interference may be avoided for sensitive UEs. The method is to be performed e.g. in an initializing phase.

An exemplifying method performed by a base station BS1 for coordinating resources on a Physical Uplink Control Channel, PUCCH, between neighboring base stations is illustrated in FIG. 6. The method comprises receiving 601 information regarding resources used by a neighboring base station, BS2, for PUCCH, the information comprising an indication regarding a division into at least a first and a second section of the PUCCH resources in time, frequency and/or code, wherein the first section is associated with a first group of UEs, and the second section is associated with a second group of UEs. The method further comprises determining 602, from amongst corresponding sections of PUCCH resources in time, frequency and/or code, a section that is to be used by BS1 for the first group of UEs; such that the determined section does not coincide with the section used by the neighboring base station for the first group of UEs. Further, the method comprises allocating 603 PUCCH resources to UEs belonging to the first group in the determined section and PUCCH resources to UEs belonging to a second group in another section.

The method may further comprise providing information to a neighboring base station regarding a determined section of PUCCH resources in time, frequency and/or code, which is to be used by BS1 for the first group of UEs.

The resources in time, frequency and/or code may be negotiated between the neighboring BSs in an iterative manner. That is, during a process of dividing the PUCCH resources between BSs, a BS can receive information from a neighboring BS; determine which PUCCH resources to use for different groups of UEs; provide information of these determined PUCCH resources to one or more neighboring base stations; and then receive new information from a neighboring BS, which has changed the PUCCH resources to use for a certain group of UEs. The process may then be iterated, until the BSs have divided the PUCCH resources between them in an adequate manner. This process could be supervised and/or controlled e.g. by a maintenance node in a higher hierarchical level in the communication network. The base stations/nodes in the communication network may function as a "self organizing network" in regard of the division of PUCCH resources for use with certain groups of UEs.

Figure 8A:
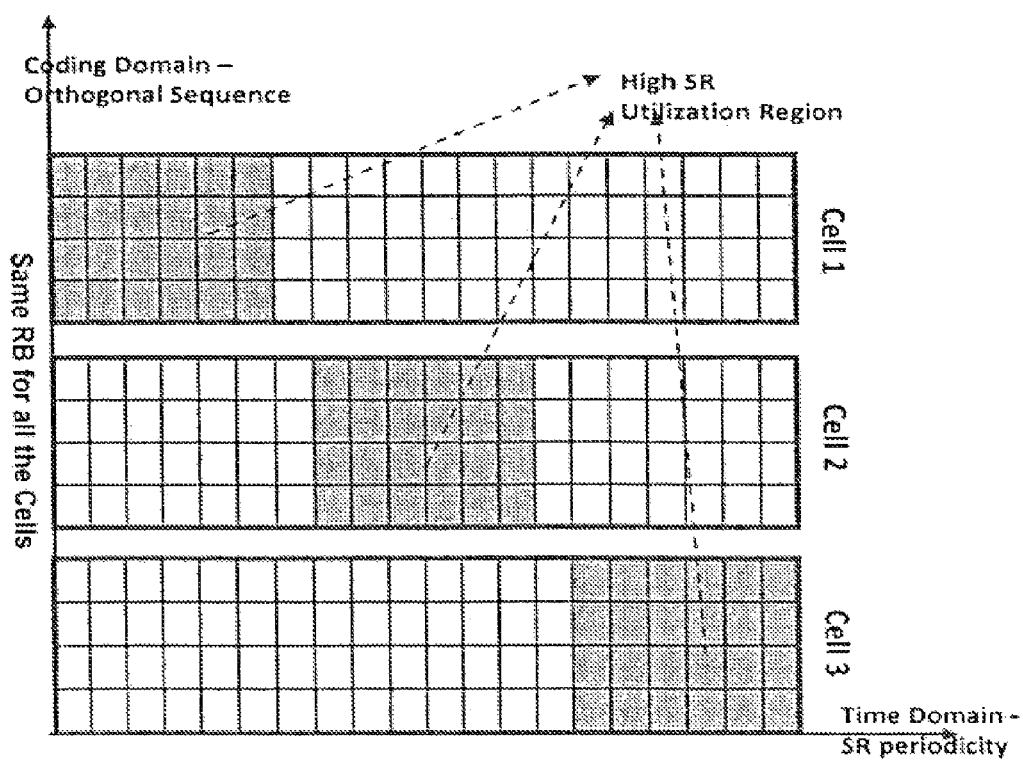
FIGS. 8a and 8b shows exemplifying PUCCH sections or regions for UE type separation in three different cells.
Figure 8B:
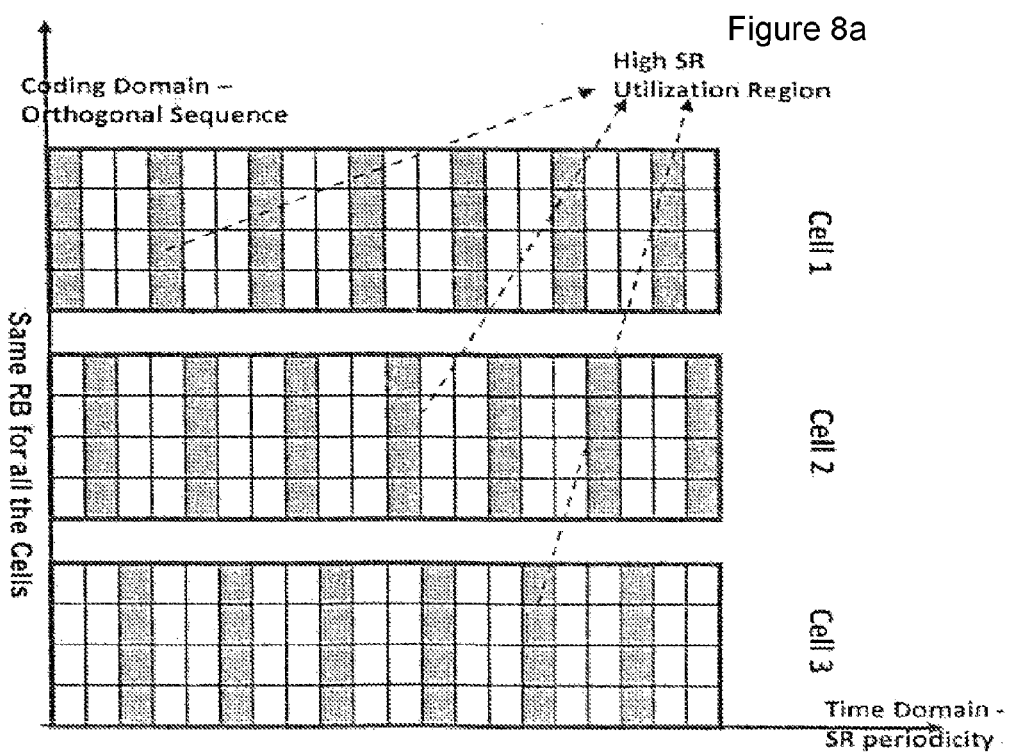

Two examples of the described method of separating the High SR utilization PUCCH regions between neighboring coordinated cells are illustrated in FIGS. 8a and 8b. In FIG. 8a, resources used for High SR Utilization UEs are illustrated in grey for three different cells. The "High SR usage" resources are separated in time and coding between cells, but uses the same RB (i.e. frequencies) in all three cells. FIG. 8b illustrates another type of separation of in the time domain to avoid inter-cell SR interference. Other types of separations may also, or alternatively, be used.

The division of the High SR utilization regions may for example be determined by a splitting factor. Further, when a High SR utilization UE enters into a cell, the RBS may first search for available PUCCH SR resource in a High SR utilization region, to see if any resource in this region is available for the UE. When the High SR utilization region is filled e.g. up to a predetermined threshold, the UE may be given a resource in a Low SR utilization region. In the same way, when a Low SR utilization UE enters into a cell, the UE is allocated a PUCCH resource in a Low SR utilization region, but if no resources are available in such a region, the UE may be allocated a resource in a High SR utilization region. Since, it is the data traffic which defines the UE-type (high SR utilization or not) the UE type may change when setting up a new service or ending a service. This may be determined e.g. based on information related to service bearer setup or service bearer release (shut down). The RBS may then reallocate the UE, and move it to a new PUCCH resource in a region used for UEs of the newly entered UE type. For example, if a UE releases a high SR utilization bearer and "becomes" a Low SR utilization user, the RBS may search for a free PUCCH SR resource in a Low SR utilization region and accordingly reallocate the UE, given it was not already allocated in such a region. If there are no PUCCH SR resources available in the new type region, the UE may remain in the region where it was allocated.

Figure 9A:
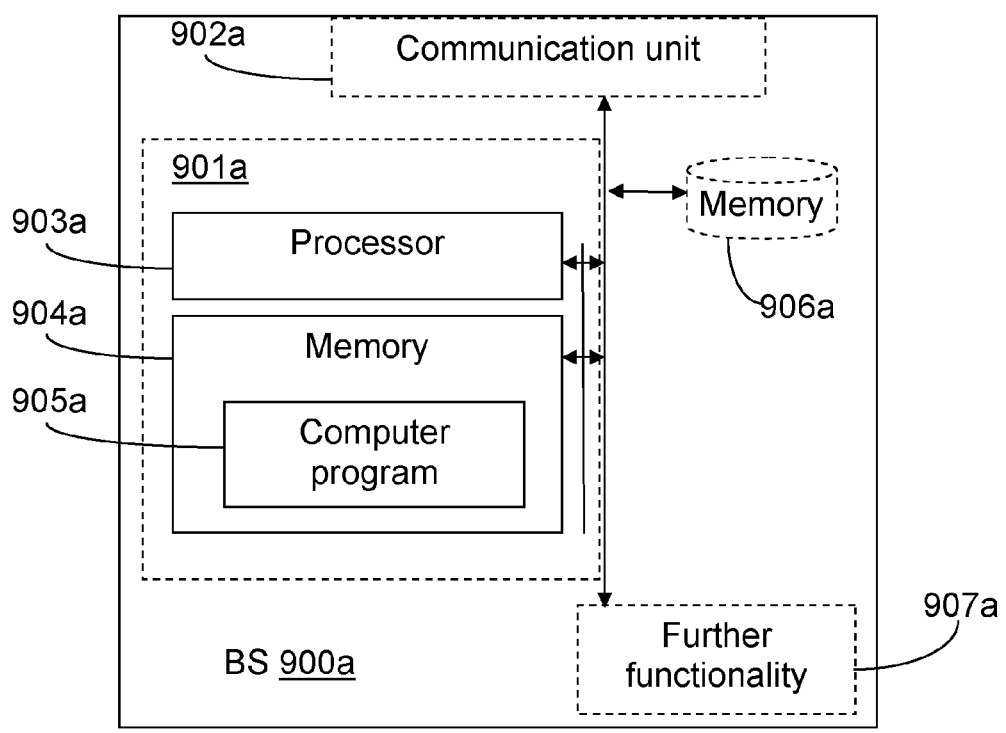
FIGS. 9a and 9b are block diagrams illustrating exemplifying embodiments of a base station, according to the herein suggested solution.

Exemplifying Base Station, FIG. 9a

Embodiments described herein also relate to a base station. The base station is associated with the same technical features, objects and advantages as the method described above and illustrated e.g. in FIG. 4. The base station will be described in brief in order to avoid unnecessary repetition.

Below, an exemplifying base station 900a, adapted to enable the performance of an above described method will be described with reference to FIG. 9a. The base station is operable to serve a number of UEs.

The base station 900a is illustrated as to communicate with other entities via a communication unit 902a, which may be considered to comprise conventional means for wireless and/or wired communication in accordance with a communication standard within which the receiving node is operable. The arrangement and/or base station may further comprise one or more storage units, 906a. The arrangement and/or receiving node may further comprise other functional units 907a, for providing e.g. regular base station functions, such as scheduling and coding of signals.

The part of the base station which is mostly related to the herein suggested solution is illustrated as an arrangement 901a surrounded by a broken/dashed line. The arrangement and possibly other parts of the base station are adapted to enable the performance of one or more of the methods or procedures described above and illustrated e.g. in FIG. 4.

The base station illustrated in FIG. 9a comprises processing means, in this example in form of a processor 903a and a memory 904a, wherein said memory is containing instructions 905a executable by said processor. The processing means are operative to determine a type of service associated with a UE, and to determine whether the UE belongs to a first group of UEs or a second group of UEs, based on a/the type of service(s) associated with the UE. The processing means are further operable to, when the UE belongs to the first group of UEs, allocate resources on the PUCCH to the UE in a first section of PUCCH resources; and further of receiving scheduling requests, SRs, from the UE in the first section of PUCCH resources. The processing means are further operable to, when the UE belongs to the second group of UEs, allocate resources on the PUCCH to the UE in a second section of PUCCH resources; and to receive SRs from the UE in the second section of PUCCH resources. The first and second section of resources on the PUCCH are separated in at least one of the dimensions time, frequency and code. Thus, protection of the UEs in the first group from inter cell interference on the PUCCH is enabled.

Figure 9B:
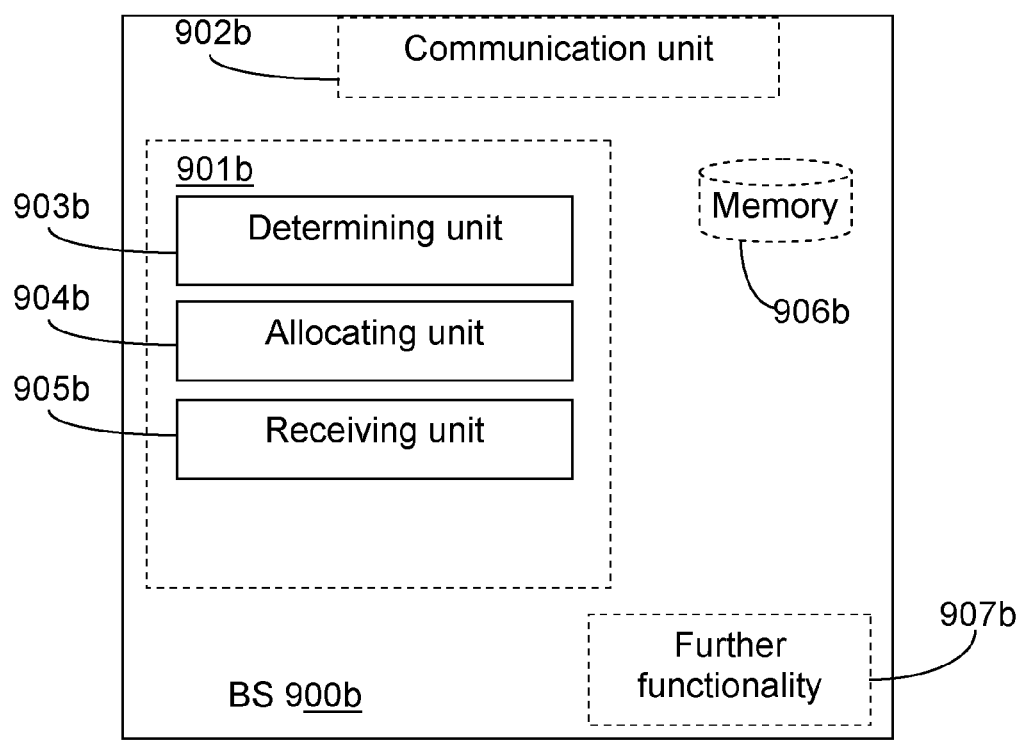

The arrangement 901a may alternatively be implemented and/or schematically described as illustrated in FIG. 9b. The arrangement 901b comprises a determining unit 904b, for determining a type of service associated with a UE; and for determining whether the UE belongs to a first group of UEs or a second group of UEs, based on a/the type of service associated with the UE. The arrangement 901b further comprises an allocating unit 904b for, when the UE belongs to the first group of UEs, allocating resources on the PUCCH to the UE in a first section of PUCCH resources; and for, when the UE belongs to the second group of UEs, allocating resources on the PUCCH to the UE in a second section of PUCCH resources. The arrangement 901b further comprises a receiving unit 905b for, when the UE belongs to the first group of UEs, receiving SRs from the UE in the first section of PUCCH resources; and for, when the UE belongs to the second group of UEs, receiving SRs from the UE in the second section of PUCCH resources.

The arrangement 901b may comprise units operable to perform actions previously described herein, e.g. determining the type of service based on information related to the setup or release of a service bearer for the UE; and/or the number of SRs received from the UE during a predefined time window; or determining whether the UE belongs to the first or second group of UEs further based on the location of the UE and/or the movement of the UE.

The arrangement 901b, and other parts of the base station 900b could be implemented e.g. by one or more of: a processor or a micro processor and adequate software and storage therefore, a Programmable Logic Device (PLD) or other electronic component(s)/processing circuit(s) configured to perform the actions mentioned above.

Figure 10A:
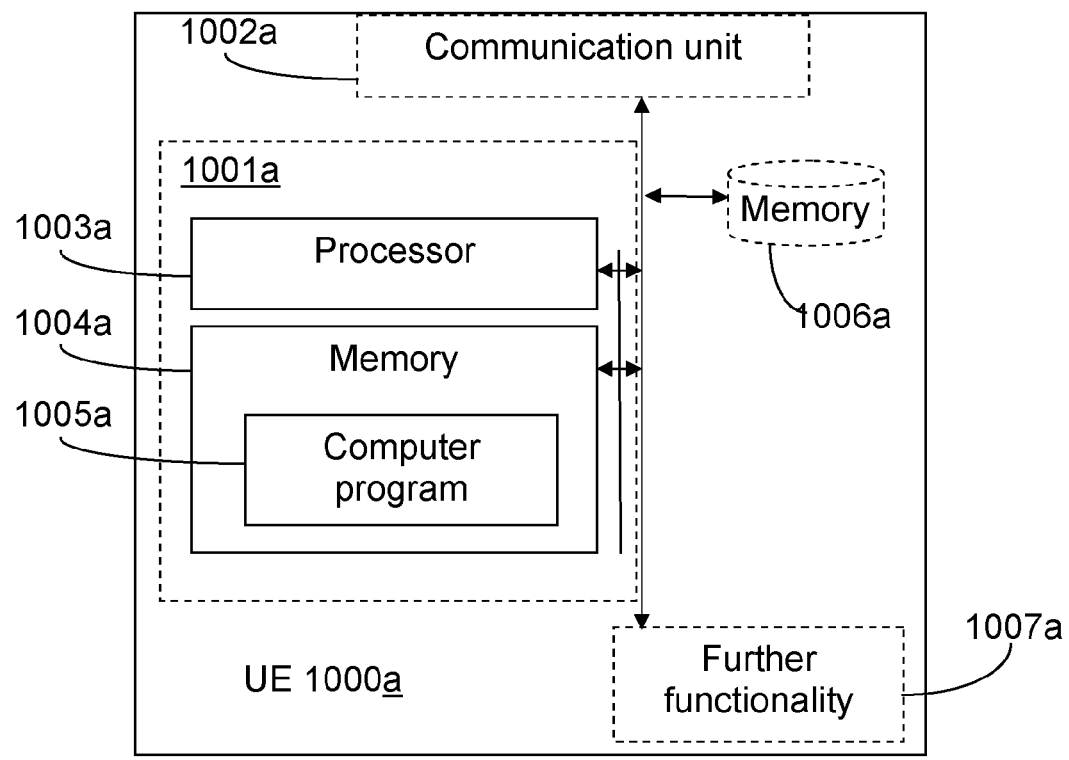
FIGS. 10a and 10b are block diagrams illustrating exemplifying embodiments of a UE, according to the herein suggested solution.

Exemplifying UE, FIG. 10a

Embodiments described herein also relate to a UE. The UE is associated with the same technical features, objects and advantages as the method described above and illustrated e.g. in FIG. 5. The UE will be described in brief in order to avoid unnecessary repetition.

The UE 1000a is illustrated as to communicate with other entities via a communication unit 1002a, which may be considered to comprise conventional means for wireless communication in accordance with a communication standard within which the UE is operable. The arrangement and/or UE may further comprise one or more storage units, 1006a. The arrangement and/or UE may further comprise other functional units 1007a, for providing e.g. regular UE functions, such as channel measurements and coding of signals.

The part of the UE which is mostly related to the herein suggested solution is illustrated as an arrangement 1001a surrounded by a broken/dashed line. The arrangement and possibly other parts of the UE are adapted to enable the performance of one or more of the methods or procedures described above and illustrated e.g. in FIG. 5.

Below, an exemplifying UE 1000a, adapted to enable the performance of an above described method will be described with reference to FIG. 10a. The UE is operable to be associated with resources on a PUCCH, said resources being allocated to the UE by a base station, for transmission of scheduling requests, SRs, the UE being further operable to be associated with one of a first and a second group of UEs, the UE comprising processing means, in this example in form of a processor 1003a and a memory 1004a, wherein said memory is containing instructions 1005a executable by said processor. When the instructions are executed by the processor, they cause the base station to perform the actions described below. The processing means are operative to transmit SRs to the base station on the resources allocated to the UE by the base station; and further to, when a change associated with the UE implies that the UE should be associated with the other one of the first and the second group of UEs; receive, from the base station, an indication of other resources on the PUCCH, to be used by the UE for transmission of SRs to the base station, instead of the previously used resources. The processing means are further operable to transmit SRs to the base station on the indicated resources.

The change may be a change of services; a change of location and/or a change of movement/velocity. The processing means may further be operable to determine a change of service based on information related to a setup or release of a service bearer and/or the number of SRs received from the UE during a predefined time window.

Figure 10B:
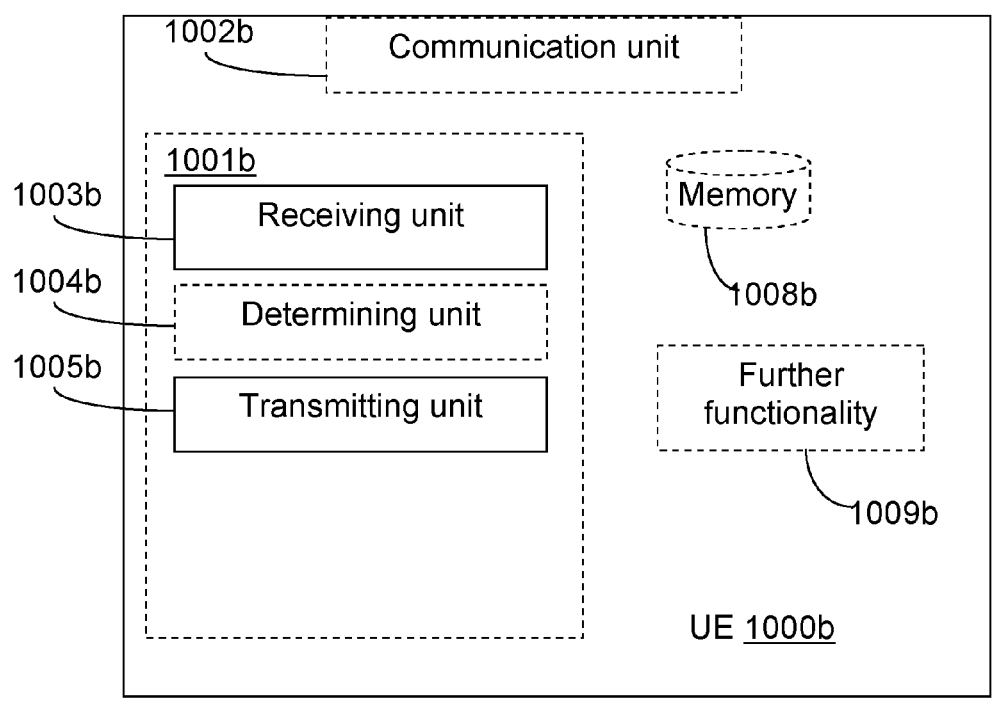

The arrangement 1001a may alternatively be implemented and/or schematically described as illustrated in FIG. 10b. The arrangement 1001b comprises a receiving unit 1003b, for, when a change associated with the UE implies that the UE should be associated with the other one of the first and the second group of UEs, receiving from the base station, an indication of other resources on the PUCCH, to be used by the UE for transmission of SRs to the base station, instead of the previously used resources. Further, the arrangement comprises a transmitting unit 1005b for transmitting SRs to the base station on the indicated resources. The transmitting unit 1005b may also be used for transmitting SRs on the resources denoted "the previously used resources" before the change of resources to the indicated resources. Here, the "previously used resources" are associated with another UE group than the indicated resources. The arrangement could also comprise a determining unit 1004b for determining e.g. when to end the second reception mode.

The arrangement 1001b, and other parts of the UE 1000b could be implemented e.g. by one or more of: a processor or a micro processor and adequate software and storage therefore, a Programmable Logic Device (PLD) or other electronic component(s)/processing circuit(s) configured to perform the actions mentioned above.

Figure 11A:
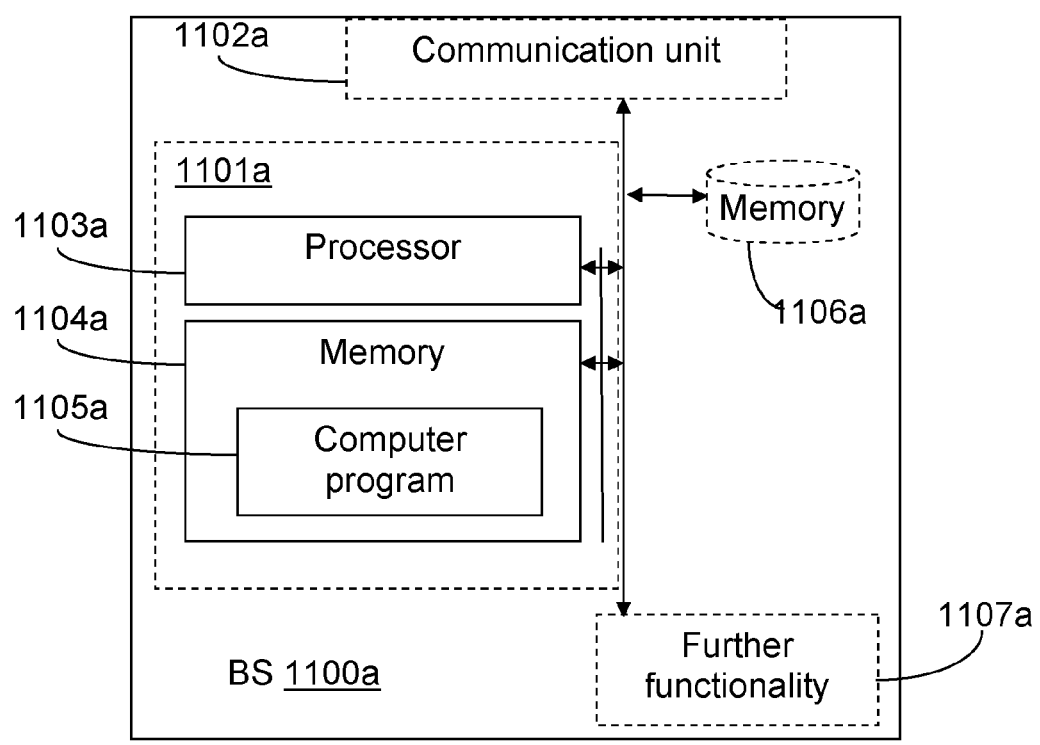
FIGS. 11a and 11b are block diagrams illustrating exemplifying embodiments of a base station, according to the herein suggested solution.

Exemplifying Base Station, FIG. 11a

Embodiments described herein also relate to a base station for coordinating the PUCCH SR resources between neighboring base stations/cells. The base station is associated with the same technical features, objects and advantages as the method described above and illustrated e.g. in FIG. 6. The base station will be described in brief in order to avoid unnecessary repetition.

Below, an exemplifying base station 1100a, adapted to enable the performance of an above described method will be described with reference to FIG. 11a. The base station is operable to serve a number of UEs.

The base station 1100a is illustrated as to communicate with other entities via a communication unit 1102a, which may be considered to comprise conventional means for wireless and/or wired communication in accordance with a communication standard within which the receiving node is operable. The arrangement and/or base station may further comprise one or more storage units, 1106a The arrangement and/or receiving node may further comprise other functional units 1107a, for providing e.g. regular base station functions, such as scheduling and coding of signals.

The part of the base station which is mostly related to the herein suggested solution is illustrated as an arrangement 1101a surrounded by a broken/dashed line. The arrangement and possibly other parts of the base station are adapted to enable the performance of one or more of the methods or procedures described above and illustrated e.g. in FIG. 6.

The base station illustrated in FIG. 11a comprises processing means, in this example in form of a processor 1103a and a memory 1104a, wherein said memory is containing instructions 1105a executable by said processor. The processing means are operative to receive information regarding resources used by a neighboring base station, BS2, for PUCCH, the information comprising an indication regarding a division into at least a first and a second section of the PUCCH resources in time, frequency and/or code, wherein the first section is associated with a first group of UEs, and the second section is associated with a second group of UEs. The processing means are further operative to determine, from amongst corresponding sections of PUCCH resources in time, frequency and/or code, a section that is to be used by BS1 for the first group of UEs; such that the determined section does not coincide with the section used by the neighboring base station for the first group of UEs. Further, the processing means are operable to allocate PUCCH resources to UEs belonging to the first group in the determined section and PUCCH resources to UEs belonging to a second group in another section.

Figure 11B:
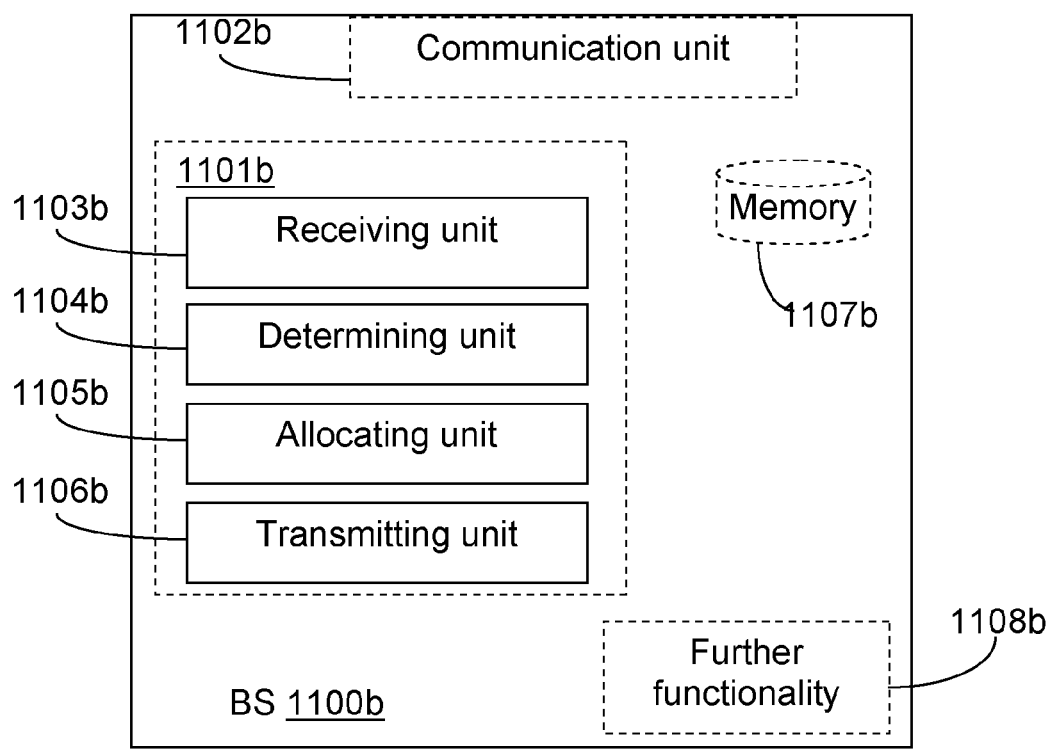

The processing means may further be operative to provide information to a neighboring base station regarding a determined section of PUCCH resources in time, frequency and/or code, which is to be used by BS1 for the first group of UEs The arrangement 1101a may alternatively be implemented and/or schematically described as illustrated in FIG. 11b. The arrangement 1101b comprises a receiving unit 1103b, for receiving information regarding resources used by a neighboring base station for PUCCH, the information comprising an indication regarding a division into at least a first and a second section of the PUCCH resources in time, frequency and/or code, wherein the first section is associated with a first group of UEs, and the second section is associated with a second group of UEs. The arrangement further comprises a determining unit 1104b, for determining, from amongst corresponding sections of PUCCH resources in time, frequency and/or code, a section that is to be used by BS1 for the first group of UEs; such that the determined section does not coincide with the section used by the neighboring base station for the first group of UEs. The arrangement further comprises an allocating unit 1105b, for allocating PUCCH resources to UEs belonging to the first group in the determined section and PUCCH resources to UEs belonging to a second group in another section.

The arrangement 1101b may comprise a transmitting unit 1106b for transmitting information, to a neighboring base station, BS2, regarding a determined section of PUCCH resources in time, frequency and/or code, which is to be used by BS1 for the first group of UEs.

The arrangement 1101b, and other parts of the base station 1100b could be implemented e.g. by one or more of: a processor or a micro processor and adequate software and storage therefore, a Programmable Logic Device (PLD) or other electronic component(s)/processing circuit(s) configured to perform the actions mentioned above.

Figure 12:
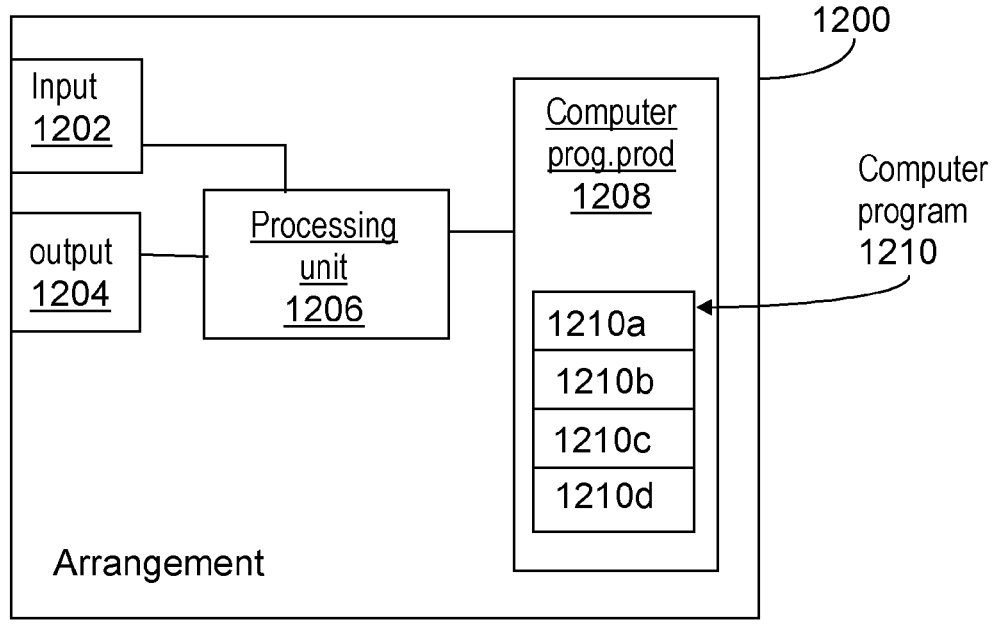
FIGS. 12-14 are block charts illustrating arrangements according to exemplifying computer implemented embodiments.
Figure 13:
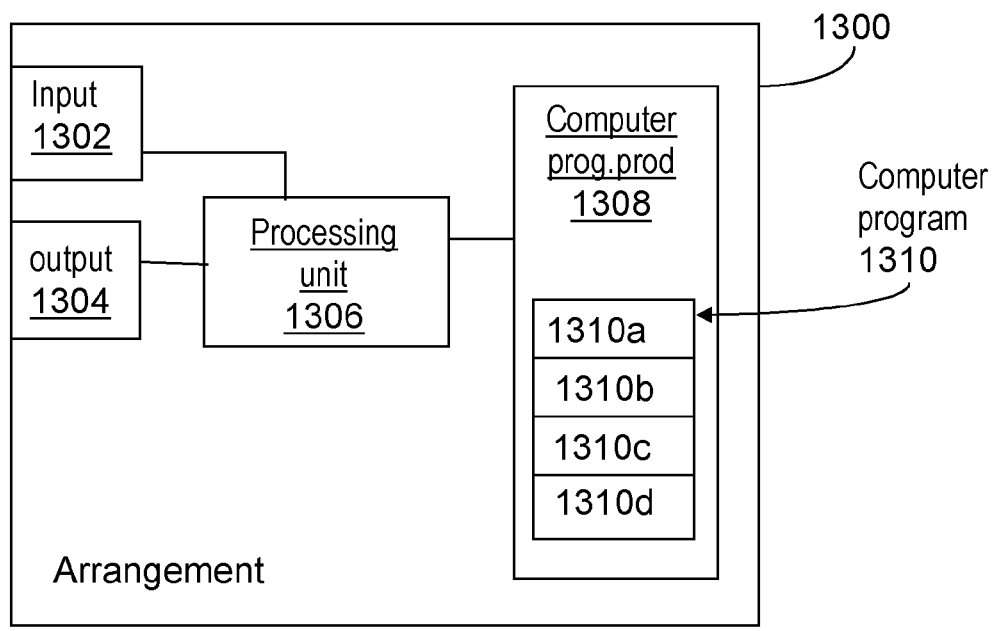
Figure 14:
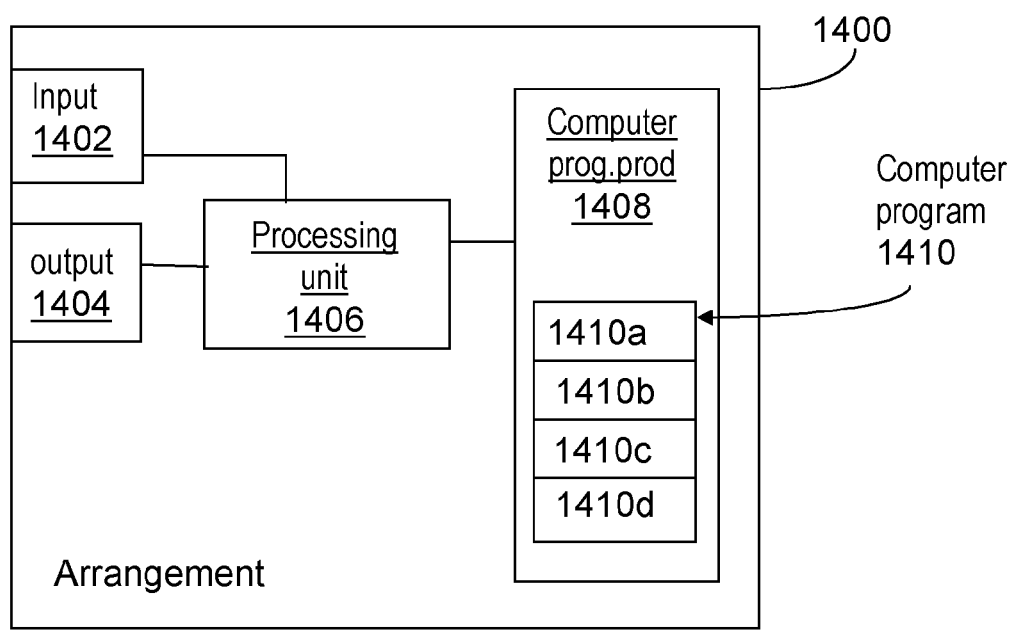

Arrangements, FIGS. 12-14

FIG. 12 schematically shows an embodiment of an arrangement 1200 in a base station, which also can be a way of disclosing an embodiment of the arrangement 901a in a base station illustrated in FIG. 9a. Comprised in the arrangement 1200 are here a processing unit 1206, e.g. with a DSP (Digital Signal Processor). The processing unit 1206 may be a single unit or a plurality of units to perform different actions of procedures described herein. The arrangement 1200 may also comprise an input unit 1202 for receiving signals from other entities, and an output unit 1204 for providing signal(s) to other entities. The input unit 1202 and the output unit 1204 may be arranged as an integrated entity.

Furthermore, the arrangement 1200 comprises at least one computer program product 1208 in the form of a non-volatile or volatile memory, e.g. an EEPROM (Electrically Erasable Programmable Read-Only Memory), a flash memory and/or a hard drive. This could be a plug-in memory, such as a USB memory. The computer program product 1208 comprises a computer program 1210, which comprises code means, which when executed in the processing unit 1206 in the arrangement 1200 causes the arrangement and/or the base station to perform the actions e.g. of any of the procedures or methods described earlier, e.g. in conjunction with any of FIG. 4 or 7.

The computer program 1210 may be configured as a computer program code structured in computer program modules. Hence, in an exemplifying embodiment, the code means in the computer program 1210 of the arrangement 1200 comprises a determining module 1210a for determining a type of service associated with a UE; and for determining whether the UE belongs to a first group of UEs or a second group of UEs, based on a type of service associated with the UE s. The computer program 1210 further comprises an allocating module 1210b for, when the UE belongs to the first group of UEs, allocating resources on the Physical Uplink Control Channel, PUCCH to the UE in a first section of PUCCH resources; and when the UE belongs to the second group of UEs, allocating resources on the PUCCH to the UE in a second section of PUCCH resources.

The computer program 1210 further comprises a receiving module 1210c for, when the UE belongs to the first group of UEs, receiving SRs from the UE in the first section of PUCCH resources; and, when the UE belongs to the second group of UEs, receiving SRs from the UE in the second section of PUCCH resources.

The modules 1210a-c could essentially perform, at least part of, the actions indicted in any of FIG. 4. When the different modules 1210a-c are executed in the processing unit 1206, they may correspond to the units 903b-905b of FIG. 9b.

A similar embodiment could be implemented for a corresponding UE, and a base station for coordinating resources. FIG. 13 illustrates such an arrangement for use in a UE. The difference from the arrangement in FIG. 12 is the computer program modules, which instead comprises code which when executed in the processing unit 1306 in the arrangement 1300 causes the arrangement and/or the UE to perform the actions e.g. of any of the procedure described earlier, e.g. in conjunction with FIG. 5.

Similarly, an arrangement for use in a base station could be implemented, which is illustrated in FIG. 14. The difference from the arrangements in FIGS. 12 and 13 is the computer program modules, which instead comprises code which when executed in the processing unit 1406 in the arrangement 1400 causes the arrangement and/or the base station to perform the actions e.g. of any of the procedure described earlier, e.g. in conjunction with FIG. 6.

Although the code means in the embodiments disclosed above in conjunction with FIGS. 12-14 are implemented as computer program modules which when executed in the processing unit causes the arrangement and/or node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory), an EEPROM and/or a USB memory, and the computer program modules described above could in alternative embodiments be distributed on different computer program products in the form of memories within the network node.

It is to be understood that the choice of interacting units or modules, as well as the naming of the units are only for exemplifying purpose, and base station nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the presently described concept, for it to be encompassed hereby.

The invention claimed is:

1. A method performed by a base station in a wireless communication network, the method comprising:
   determining a type of service associated with a UE based on a number of scheduling requests (SRs) received from the UE during a predefined time window;
   determining whether the UE belongs to a first group of UEs served by the base station or a second group of UEs served by the base station, based on the type of service associated with the UE, wherein the first group comprises UEs currently applying services generating bursty traffic and generating more SRs per time unit than the second group of UEs, and wherein the second group comprises UEs applying services generating less bursty traffic than UEs in the first group and generating less SRs per time unit than UEs in the first group; and
   when the UE belongs to the first group of UEs:
      allocating resources on the Physical Uplink Control Channel (PUCCH) to the UE in a first section of PUCCH resources;
      receiving SRs from the UE in the allocated resources in the first section of PUCCH resources; and
   when the UE belongs to the second group of UEs:
      allocating resources on the PUCCH to the UE in a second section of PUCCH resources;
      receiving SRs from the UE in the second section of PUCCH resources;
   wherein the first and second sections of resources on the PUCCH are separated in at least one of the dimensions of time, frequency and code.

2. The method according to claim 1, wherein the type of service associated with the UE is determined based on information related to a setup or release of a service bearer for the UE.

3. The method according to claim 1, wherein the determining of whether the UE belongs to the first or second group of UEs is further based on the location of the UE and/or the movement of the UE.

4. A method performed by a UE associated with resources on a Physical Uplink Control Channel (PUCCH), said resources being allocated to the UE in a first section of PUCCH resources by a base station, for transmission of scheduling requests (SRs), the method comprising: transmitting SRs to the base station on the resources allocated to the UE by a base station, the UE being associated with one of a first group of UEs served by the base station and a second group of UEs served by the base station, wherein the first group comprises UEs currently applying services generating bursty traffic and generating more SRs per time unit than the second group of UEs, and wherein the second group comprises UEs applying services generating less bursty traffic than UEs in the first group and generating less SRs per time unit than UEs in the first group; and when a change associated with the UE implies that the UE should be associated with the other one of the first and the second groups of UEs, wherein the change is a change of service associated with the UE which is determined based on the number of SRs transmitted from the UE during a predefined time window: receiving, from the base station, an indication of other resources on the PUCCH in a second section, to be used by the UE for transmission of SRs to the base station, instead of the previously used resources; and transmitting SRs to the base station on the indicated resources; wherein the first and second sections of resources on the PUCCH are separated in at least one of the dimensions of time, frequency and code.

5. The method according to claim 4, wherein the change is at least one of: a change of services; a change of location; and a change of movement.

6. The method according to claim 4, wherein the change is a change of service associated with the UE, which is determined based on information related to a setup or release of a service bearer.

7. A base station in a wireless communication network, the base station being operable to serve a number of User Equipments (UEs), the base station comprising a processor configured to:
  determine a type of service associated with a UE based on a number of scheduling requests (SRs) received from the UE during a predefined time window;
  determine whether the UE belongs to a first group of UEs served by the base station or a second group of UEs served by the base station, based on the type of service associated with the UE, wherein the first group comprises UEs currently applying services generating bursty traffic and generating more SRs per time unit than the second group of UEs, and wherein the second group comprises UEs applying services generating less bursty traffic than UEs in the first group and generating less SRs per time unit than UEs in the first group; and
  when the UE belongs to the first group of UEs:
    allocate resources on the Physical Uplink Control Channel (PUCCH) to the UE in a first section of PUCCH resources;
    receive SRs from the UE in the allocated resources in the first section of PUCCH resources; and
  when the UE belongs to the second group of UEs:
    allocate resources on the PUCCH to the UE in a second section of PUCCH resources;
    receive SRs from the UE in the second section of PUCCH resources;
  wherein the first and second sections of resources on the PUCCH are separated in at least one of the dimensions of time, frequency and code.

8. The base station according to claim 7, wherein the type of service associated with the UE is determined based on information related to a setup or release of a service bearer for the UE.

9. The base station according to claim 7, wherein the determining of whether the UE belongs to the first or second group of UEs is further based on the location of the UE and/or the movement of the UE.

10. User Equipment (UE), operable to be associated with resources on a Physical Uplink Control Channel (PUCCH), said resources being allocated to the UE in a first section of PUCCH resources by a base station, for transmission of scheduling requests (SRs), the UE being further operable to be associated with one of a first and a second group of UEs, the UE comprising a processor configured to:
  transmit SRs to the base station on the resources allocated to the UE by a base station, the UE being associated with one of a first group of UEs served by the base station and a second group of UEs served by the base station, wherein the first group comprises UEs currently applying services generating bursty traffic and generating more SRs per time unit than the second group of UEs, and wherein the second group comprises UEs applying services generating less bursty traffic than UEs in the first group and generating less SRs per time unit than UEs in the first group;
  when a change associated with the UE implies that the UE should be associated with the other one of the first and the second groups of UEs, wherein the change is a change of service associated with the UE which is determined based on the number of SRs transmitted from the UE during a predefined time window:
  receive, from the base station, an indication of other resources on the PUCCH in a second section, to be used by the UE for transmission of SRs to the base station, instead of the previously used resources; and
  transmit SRs to the base station on the indicated resources;
  wherein the first and second sections of resources on the PUCCH are separated in at least one of the dimensions of time, frequency and code.

11. The UE according to claim 10, wherein the change is at least one of:
  a change of services;
  a change of location; and
  a change of movement.

12. The UE according to claim 10, wherein the change is a change of service associated with the UE, which is determined based on information related to a setup or release of a service bearer.

* * * * *